United States Patent [19]

Takiura et al.

[11] 4,089,917
[45] May 16, 1978

[54] PROCESS OF CROSS-LINKING AND EXTRUSION MOLDING THERMOPLASTIC POLYMERS

[75] Inventors: Mamoru Takiura, Kawasaki; Susumu Nakajyo, Tokyo; Noriyuki Kikuchi, Kawaguchi; Masahiko Ishida, Yokohama, all of Japan

[73] Assignee: Ikegai Tekko Kabushiki Kaisha, Tokyo, Japan

[21] Appl. No.: 624,992

[22] Filed: Oct. 22, 1975

Related U.S. Application Data

[63] Continuation-in-part of Ser. No. 470,656, May 16, 1974, abandoned.

[51] Int. Cl.² .............................................. B29C 25/00
[52] U.S. Cl. .................................. 264/40.3; 264/40.6; 264/176 R; 264/236
[58] Field of Search ................. 264/211, 40.3, 176 R, 264/236

[56] References Cited

U.S. PATENT DOCUMENTS

| | | | |
|---|---|---|---|
| 2,478,013 | 8/1949 | Roddy | 264/349 |
| 3,480,997 | 12/1969 | List | 264/176 F |
| 3,546,326 | 12/1970 | Seifert et al. | 264/176 R |
| 3,737,506 | 6/1973 | Martin et al. | 264/176 F |
| 3,758,658 | 9/1973 | Riggert | 264/176 F |
| 3,876,736 | 4/1975 | Takiura | 264/176 R |
| 3,928,525 | 12/1975 | Fuwa et al. | 264/174 |

Primary Examiner—Jay H. Woo
Attorney, Agent, or Firm—Blanchard, Flynn, Thiel, Boutell & Tanis

[57] ABSTRACT

Moldings of cross-linked thermoplastic polymers are obtained by the method comprising: melting a cross-linkable thermoplastic polymer admixed with a cross-linking agent by applying a temperature and a pressure insufficient to cause a cross-linking reaction; passing the thus-melted molding material through a first orifice thereby to raise its temperature by a shearing action to an extent that will start a cross-linking reaction; passing the thus-treated melted molding material through a second orifice thereby further to raise its temperature to an extent that will effect a rapid cross-linking reaction of the molding material; and then introducing the thus-treated molding material into a pre-forming die to advance the cross-linking reaction of the molding material and then cooling the molding material by means of a liquid under an elevated pressure.

3 Claims, 5 Drawing Figures

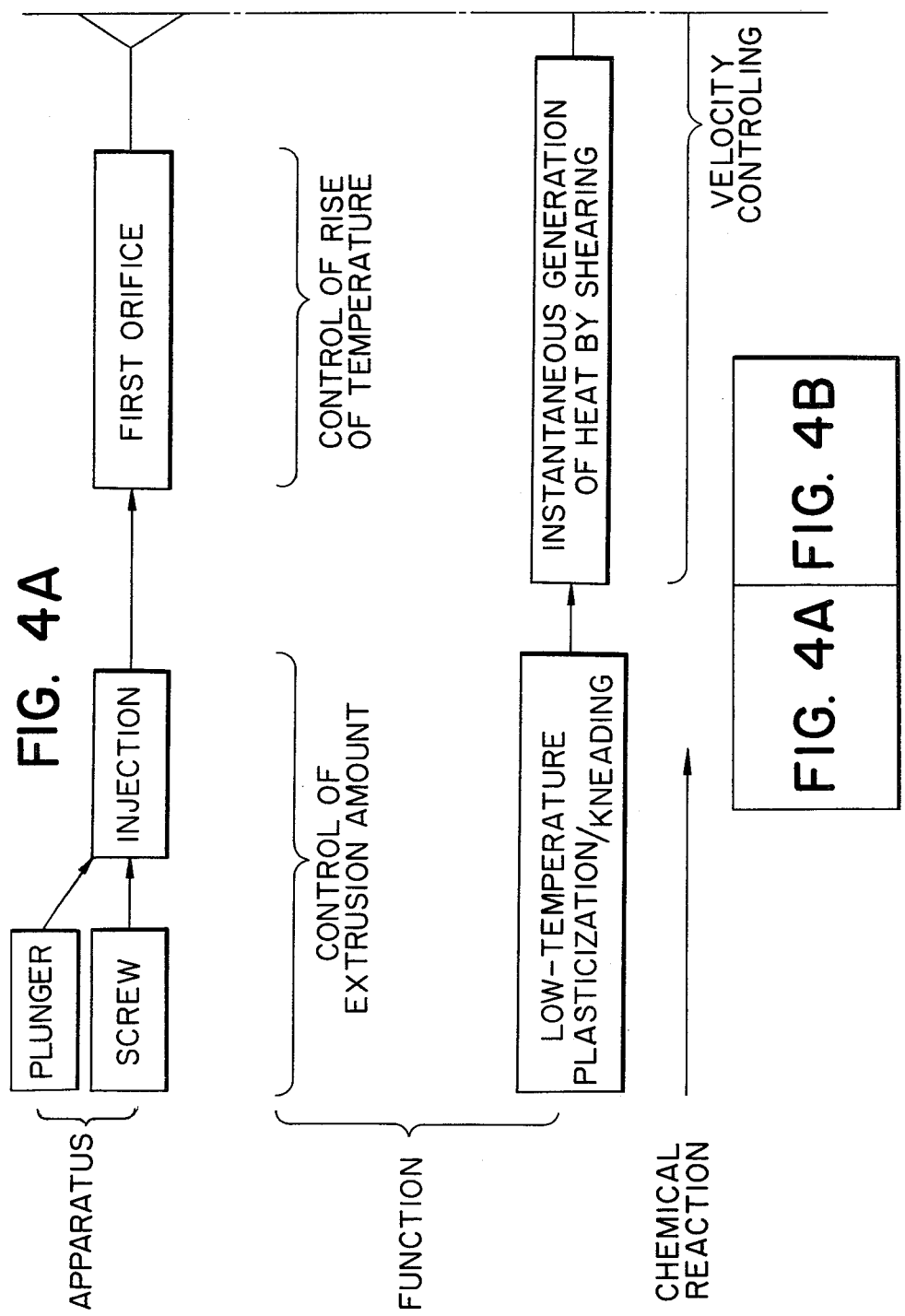

PROCESS OF CROSS-LINKING AND EXTRUSION MOLDING THERMOPLASTIC POLYMERS

CROSS REFERENCE TO RELATED APPLICATION

This application is a continuation-in-part of Ser. No. 470,656, filed May 16, 1974, now abandoned.

BACKGROUND OF THE INVENTION

1. FIELD OF THE INVENTION

The present invention relates to an improved process for cross-linking and extrusion molding a molding material comprising a cross-linkable thermoplastic polymer admixed with a cross-linking agent while causing the molding material to flow under a high pressure.

2. DESCRIPTION OF THE PRIOR ART

It is known to incorporate in various thermoplastic polymers, such as high density and low density polyethylene, a free radical cross-linking agent, such as an organic peroxide. The organic peroxide is uniformly distributed in the polymer under conditions such that a substantial cross-linking of the polymer does not occur and then the polymer is molded. During or after molding of the polymer, the temperature of the molding material is raised to a level such that the cross-linking agent decomposes to form free radicals which cause the cross-linking reaction to occur.

The thermoplastic polymers that are known to be useful in this process include polyolefins, such as polyethylene and polypropylene; polyvinyl compounds, such as polyvinyl chloride and polyvinyl chloroacetate; polyacrylonitrile; polyesters; polyepoxides; as well as mixtures, copolymers and graft-copolymers of constituents of such polymers, such as copolymers of ethylene and vinyl monomers copolymerizable with ethylene.

The cross-linking agents that are known to be useful in this process are compounds capable of yielding free radicals when heated to a certain temperature, preferably organic peroxides, hydroperoxides, peracids and peresters. Presently preferred cross-linking agents include di-t-butyl peroxide, 2,5-dimethyl-2,5-di(t-butyl peroxy)-3-hexyne and dicumyl peroxide.

In the prior art, for the purpose of extrusion molding of cross-linkable thermoplastic polymers, it has been common to employ a method comprising feeding through a pre-forming die a molding material which has been melted by applying a temperature and a pressure insufficient to cause a cross-linking reaction in a screw-type extruder, then heating the pre-formed molten material up to a temperature higher than that necessary for starting the cross-linking reaction by means of a heating medium within a cross-linking pipe connected with the preforming die, promoting the cross-linking reaction by applying a pressure of about 20 $Kg/cm^2$ in order to restrain the growth of voids in the molding and subsequently introducing the thus-reacted molded material into a cooling medium also under an elevated pressure thereby to cool and solidify it. The employment of this conventional method is most popular in the extrusion-molding of cross-linkable thermoplastic polymers.

As the heating medium, steam has hitherto been popular, but nowadays CO gas, $N_2$ gas and $SF_6$ gas are also employed. As the heating means, the use of an electric heater capable of imparting heat energy from the outside has been most prevalent. However, inasmuch as the thermal conductivity of thermoplastic polymers is so low that much time is required to raise the temperature of the inner part of moldings of such polymers uniformly by this conventional heating means, large expenses have been incurred in providing the equipment associated with the cross-linking pipe. In addition, from the view point of the quality of product, inasmuch as the molding is performed under a relatively low pressure, the void content of the resulting molded product is not always satisfactory, and especially in the case of producing high-tension cables, this would cause a serious problem.

With a view to reducing the time required for cross-linking, such processes as applying infrared heating or ultrasonic-wave heating within the cross-linking zone have been proposed. However, all these processes are intended to heat the materials after they exit from the extruding machine, and although the time required for cross-linking can be reduced thereby compared with the conventional processes, no improvement on the void content is achieved thereby, and therefore, these processes merely represent improved methods for heating the molding in the cross-linking pipe.

SUMMARY OF THE INVENTION

The present invention relates to an improvement in the high pressure fluid cross-linking molding method for cross-linkable moldable thermoplastic polymers, comprising the steps of:

1. feeding a charge of cross-linkable moldable resin and an amount of cross-linking agent capable of cross-linking said resin into a preliminary plasticizing chamber and therein plasticizing said charge under conditions of temperature and pressure which are insufficient to cause the cross-linking reaction to start so that the charge of plasticized material in said plasticizing chamber does not undergo cross-linking;

2. feeding said plasticized charge under pressure from said preliminary plasticizing chamber through a first orifice of small cross-sectional size and imparting a high pressure and a strong shearing action to said charge as it passes through said first orifice and thereby rapidly raising the temperature of the charge to a temperature at which the resin is molten and the cross-linking reaction is started, then flowing the charge, which is undergoing cross-linking, under pressure into the forward end of an accumulator chamber which is isolated from the below-mentioned preform extrusion die and which has a reciprocable plunger therein located close to the forward end of said accumulator chamber, while continuously imposing a constant static back pressure on said plunger in said accumulator chamber to resist retracting movement thereof so that the charge of plasticized material entering the forward end of said accumulator chamber from said first orifice forces said plunger to retract in said accumulator chamber against said back pressure and fills said accumulator chamber and said charge is continuously subjected to said back pressure, and closing communication between said plasticizing chamber and said accumulator chamber when said charge has been fed into said accumulator chamber;

3. holding the charge in said accumulator chamber under a pressure and temperature higher than that previously applied on said charge in said plasticizing chamber to render uniform the temperature of the charge in said accumulator chamber and to cause the cross-linking reaction to progress;

4. after said cross-linking reaction has progressed partway to completion but while said charge remains fluid, placing said accumulator chamber in communication with a second orifice of small cross-sectional area having an elongated preform extrusion die connected in series therewith, advancing said plunger in said accumulator chamber to discharge said fluid charge therefrom and flowing said fluid charge through said second orifice and imparting a high pressure and a strong shearing action to said fluid charge as it passes through said second orifice and thereby rapidly increasing the temperature of said fluid charge to accelerate the cross-linking reaction, flowing said fluid charge under pressure from said second orifice into and through said preform extrusion die to form an extrudate, and in the inlet end of said preform extrusion die flowing an inert heating fluid under pressure against the exterior of the extrudate and between said exterior and the interior wall of said preform extrusion die to maintain pressure on the extrudate and to maintain the temperature of the extrudate to complete the cross-linking reaction whereby said extrudate is maintained under high pressure and high temperature in the inlet end of said preform extrusion die and moves therethrough in substantially plug flow;

5. then moving the extrudate from said preform extrusion die through a cooled die to rigidify the extrudate and terminate cross-linking, the charge being continuously maintained under pressure throughout the foregoing steps 2 to 5, and 6. then discharging the cooled extrudate.

The present inventors have previously proposed a method and an apparatus relevant thereto as set forth in the following. That is, according to said method and apparatus, a mixture prepared by uniformly dispersing a cross-linking agent in a cross-linkable thermoplastic polymer is melted and blended by applying a temperature and a pressure insufficient to cause the cross-linking reaction within a screw-type extruding machine, the thus-melted material is supplied to a reaction chamber to effect a cross-linking reaction therein by applying a temperature and a pressure higher than that in said extruding machine, and subsequently the thus-reacted material is molded and cooled. The basic principle of this method is based on the finding that, contrary to the generally accepted concept that such materials lose their fluidity completely at the time when the cross-linking reaction is over, it is possible to prolong the duration of said fluidity by applying an elevated pressure on the material.

It has been found that when heat energy is imparted to a cross-linkable thermoplastic polymer which has been plasticized and melted by applying a temperature and a pressure insufficient to cause cross-linking within an extruding machine, the heat must be applied from the outside, and application of heat in this way is disadvantageous because the thermal conductivity of the polymer is poor and the heat energy cannot be uniformly imparted thereto in a limited period of time. Therefore, it was proposed to introduce the resin into a reaction chamber under a high pressure after raising the temperature of the resin to such an extent that the cross-linking reaction will occur within a resin pool near the tip of the screw. According to this method, because the temperature of the resin is raised while kneading said resin with a screw in the plasticizing chamber, a certain degree of uniformity can be expected in the temperature distribution of the resin supplied to the reaction chamber, but there still remain some problems to be solved. For instance, the increase of the temperature of the resin within the plasticizing chamber entails a prolongation of the time at which the resin is at a high temperature and a shortening of the duration of the period during which the resin remains fluid under high pressure. The higher is the temperature of the resin in the plasticizing chamber, the shorter is the duration of the period of fluidity of the resin, thus rendering it difficult to perform molding of said resin due to lack of sufficient fluidity thereof. In addition, when the resin is pushed into a pre-form die from the reaction chamber by means of a feed plunger, there also occurs a difference of the temperature of the resin. This is attributable to the difference of the residence times of different portions of the resin in the reaction chamber. When the resin is fed in and is discharged through the vicinity of the forward end of the reaction chamber, there occurs a definite difference of the residence times of different portions of the resin in the reaction chamber. Even when the resin is fed into the reaction chamber through one end thereof and is discharged through the opposite end thereof, it is practically difficult to eliminate the differences of said residence times completely. The reason is that, even in the latter method, the portion of the resin that first enters the reaction chamber is pushed away toward the inside wall of the reaction chamber by the next portion of resin entering the reaction chamber, and at the time of discharge from the reaction chamber, the portion of the resin first discharged from the reaction chamber is the portion present in a position near the outlet and spaced from the inside wall of the reaction chamber and this portion is pushed out in a condition in which it is wrapped in a portion of the resin which first entered the reaction chamber and was pushed to the vicinity of the inside wall thereof.

The difference of the heat histories of different portions of the resin within the reaction chamber has a great influence on the degree of cross-linking within the pre-forming die, causing irregularity of the speed of flow of the resin, and as a result, the qualitative uniformity of the final extrusion molding is reduced. Generally speaking, the longer is the heat history of the resin entering the reaction chamber, the greater is the influence of said heat history on the degree of cross-linking of the resin discharged from the reaction chamber; but when the heat history prior to discharge is very short, the difference of the degree of cross-linking that occurs within the reaction chamber is reduced. Transferring the resin from the plasticizing chamber to the reaction chamber can be effected by applying a high pressure; but when the resin is transferred from the reaction chamber to the pre-forming die, because it is difficult to impart flow resistance in the pre-forming die, the resin is subjected to rapid decompression and as a result, the cross-linking reaction, which has been suppressed by high pressure within the reaction chamber, progresses. Meanwhile, despite the use for high pressure at the time of molding in proportion to the increase in the cross-linking degree, the internal pressure of the pre-forming die is so low that the surface of the resin being extruded from the die tends to lack smoothness.

BRIEF DESCRIPTION OF THE DRAWING

FIGS. 4A and 4B are flow sheets of different portions of the process of the present invention. The block diagram shows the relationship of FIGS. 4A and 4B.

DETAILED DESCRIPTION OF THE INVENTION

Figure 4B:
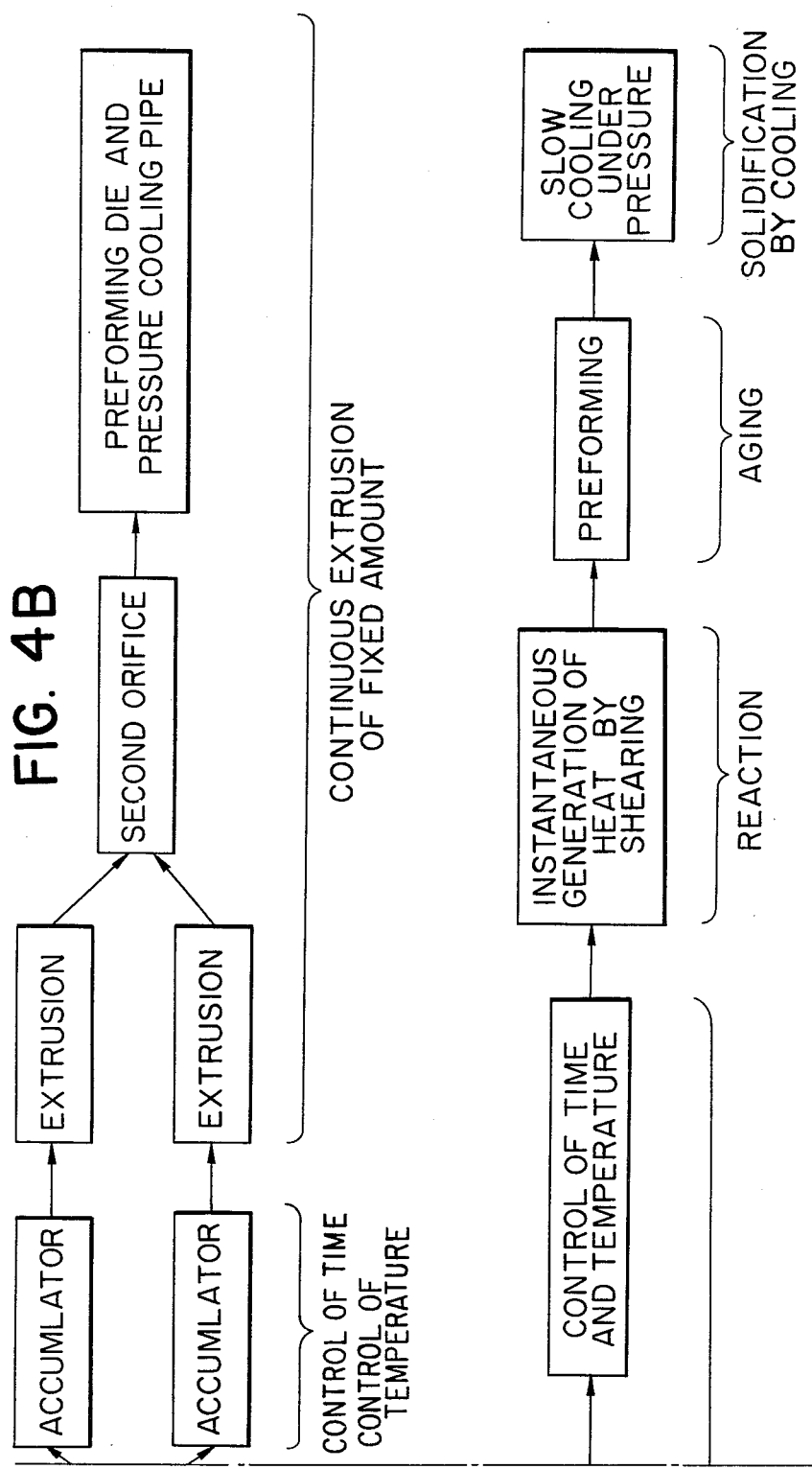

The mode of practicing the present invention will be described with reference to the flow sheet and relevant diagram shown in FIGS. 4A and 4B.

Figure 1:
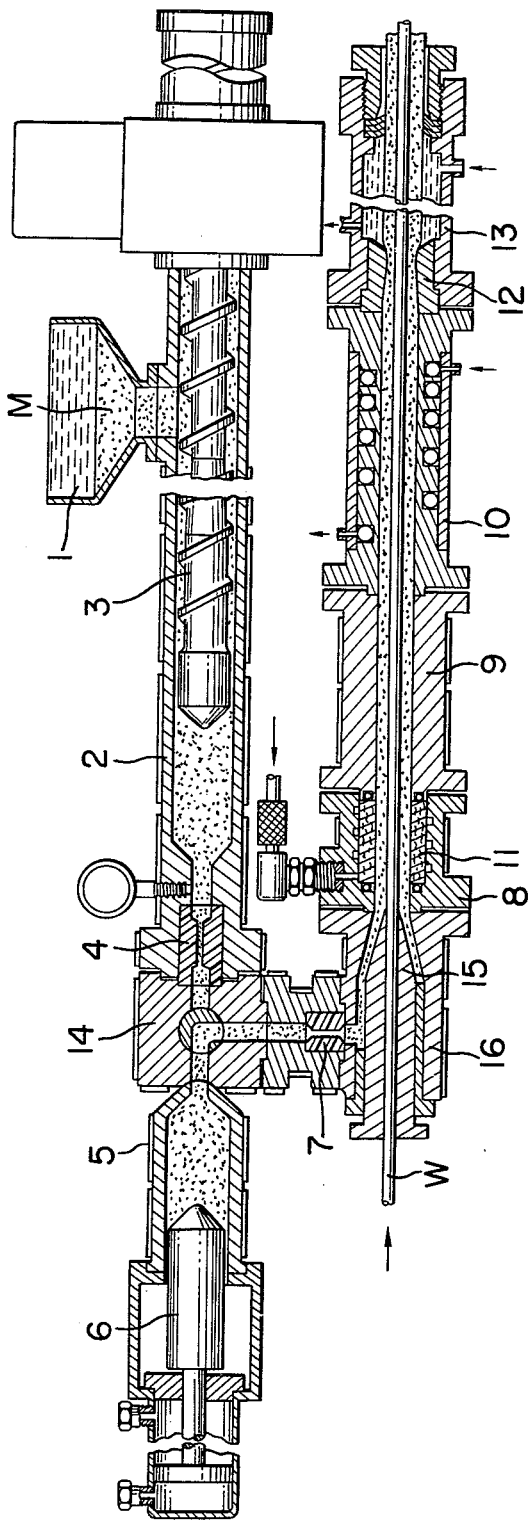
FIG. 1 is a cross-sectional view of an apparatus which can be utilized in practicing the method of the present invention.
Figure 2:
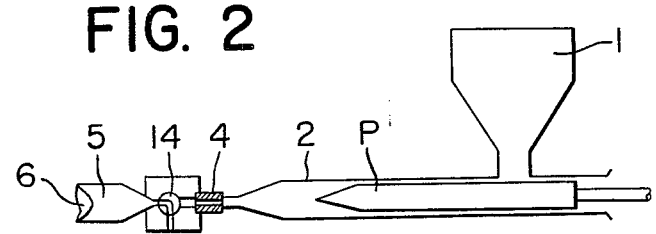
FIG. 2 is a diagrammatic view of an apparatus employing a plunger instead of a screw as a modification of the apparatus shown in FIG. 1.

In the apparatus shown in FIG. 1, the resin material M admixed with a cross-linking agent is supplied to the hopper 1 and is subjected to preliminary plasticization by rotation of the screw 3 (or the pressure of the plunger P in the case of the apparatus shown in FIG. 2) within the plasticizing chamber 2 at a temperature and under a pressure insufficient to cause the cross-linking reaction. In order to minimize differences of heat history due to the differences of the temperature of different portions of the resin and the differences of the residence times of different portions thereof in the plasticizing chamber 2, the preliminary plasticization within the plasticizing chamber 2, is conducted at a low temperature, and the material M is thoroughly mixed by the rotation of the screw 3. In the case of the plunger-type apparatus as shown in FIG. 2, the material M is instantaneously subjected to a strong shearing action at the time of being injected into the accumulator 5 from the plasticizing chamber 2 and the mixing of the resin progresses to a considerable extent. Preliminary mixing of the resin by the use of a screw-type feeder prior to supplying it to the plasticizing chamber 2 in FIG. 2 will have the effect of further promoting the mixing.

In the plasticizing chamber 2 of the apparatuses shown in FIG. 1 and FIG. 2, the feed rate of the resin is controlled by the speed of rotation of the screw 3 or by the speed of axial reciprocating motion of the plunger P, and accordingly, the amount of resin that is extruded is determined at this stage. Subsequently, by virtue of the rotation of the screw 3 or the forward stroke of the plunger P in the axial direction within the plasticizing chamber 2, the material thus preliminarily plasticized in said chamber 2 is fed under pressure through the first orifice 4, which has a very small cross-sectional area, into the accumulator 5. By virtue of the high pressure and the strong shearing action exerted on the material as it flows through the first orifice 4, the temperature of the resin is instantaneously uniformly to start the cross-linking reaction. Inasmuch as the resin undergoes the aforementioned step for elevating the temperature thereof, it is not always required that the resin be completely melted within the plasticizing chamber 2; that is, the plasticizing chamber 2 may merely function to pre-heat the material, and the thus pre-heated material can be melted by the heat generated by the high pressure and strong shearing action imposed thereon when it passes through the first orifice 4 under a high pressure caused by the rotation of the screw 3 or the forward stroke of the plunger P. In this case, however, it is required to apply a far higher pressure on the resin than is required when the resin has been preliminarily plasticized in the plasticizing chamber 2.

By changing the speed of rotation of the screw 3 or the speed of forward stroke of the plunger P, it is possible to control the quantity of heat generated by the instantaneous shearing of the material during its passage through the first orifice 4 and to raise the temperature of the resin to a desired degree. The control of the temperature of the resin at the time of injecting it into the accumulator can also be performed by changing the temperature of the resin just before it enters the first orifice 4. Further, the degree of rise in the temperature of the resin can be changed by modifying the size and/or shape of the first orifice 4. The higher is the temperature of the resin at the time it enters the first orifice 4, the lower is the viscosity of resin, and accordingly, there occurs a reduction of the amount of temperature increase caused by flow through orifice 4. The controllability of the degree of temperature increase of the resin that occurs as it flows through orifice 4 caused by increasing or decreasing the speed of rotation of the screw 3 or the speed of forward stroke of the plunger P, that is, the pressure for injection, is naturally limited because it is restricted by time requirements or technical and economic factors related to the construction of the machine. The method of changing the size and/or shape of the first orifice 4 is effective for controlling the degree of temperature increase. As the size and/or shape of the first orifice is reduced, the degree of temperature increase increases exponentially, and also the necessary pressure for injection thereof increases, but the degree of pressure increase is low relative to the degree of temperature increase. The first orifice 4 can be positioned between the plasticizing chamber 2 and the accumulator 5, for instance, it can be within the outlet of the plasticizing chamber 2, but it is desirable that it be positioned closer to the accumulator 5 when the temperature of the resin is high. In an extreme case, it can be provided in the inlet of the accumulator 5.

At the time of being fed into the accumulator 5, the resin must be under a constant static pressure, and the higher is the static pressure, the better it is from the physical point of view. In other words, the resin introduced into the accumulator 5 under pressure pushes the plunger 6 rearwardly within the accumulator against the above-mentioned static pressure. In this connection, there is a possibility that the resin can be directly discharged into some open spaces within the accumulator 5, but this must be minimized in order to minimize the quantity and size of the voids in the molded product. The principal function of the accumulator 5 is to control the timing of the cycle as well as the temperature of the resin. To be precise, once the amount of material to be extruded is determined, the operational cycles of each individual accumulator 5 will be determined according to the total number of accumulators provided. The control of time herein means compensating for the difference of time for injection of the resin from the plasticizing chamber into the accumulator. That is, the duration of the time for injection can be as long as the balance obtained by deducting the time for extrusion by the accumulator plunger from the longest complete cycle time of any accumulator. The injection time can also be less than this maximum time and in this case the holding time of the resin in the accumulator is lengthened by this additional time. The control of the temperature of the resin herein means the alleviation and elimination of the differences of the temperatures of different portions of the resin at the time they enter the accumulator. The resin, after having its temperature uniformly raised to attain a certain level by heat generated by instantaneous shearing at the time of passing the first orifice 4, then becomes subject to the velocity of the cross-linking reaction. The longer is the residence time in the accumulator 5 the more it is favorable for the progress of the cross-linking reaction. Although the pressure and temperature admittedly have some influence, too, an excessively long holding time brings on an excessive progress of cross-linking, thereby to lower the fluidity of the resin and causing a deterioration of its moldability and the properties of the resulting products.

The resin extruded from the accumulator 5 by the plunger 6 is again subjected to high pressure and strong shearing action as it passes through the second orifice 7 and its temperature is raised to such a degree that the cross-linking reaction will be accelerated by a uniform instantaneous heat generation arising from the shearing action. Subsequently, the fluid resin, wherein the cross-linking reaction is in progress, is fed under pressure into the die 8 for pre-forming. The first half 9 of the die 8 is externally heated so that the resin passing therethrough maintains an elevated temperature and the cross-linking reaction is maintained to attain a prescribed degree of cross-linking. The thus cross-linked resin is then slowly cooled in the latter half 10 of the the die 8 and the solidification by said cooling starts and progresses from the circumference inwardly.

As to the quantity of heat to be generated instantaneously by shearing at the second orifice 7, a desired value can be obtained in the same manner as occurs at the first orifice 4 by changing the flow rate, the temperature of the resin flowing in, and the size as well as the shape of orifice 7. The quantity of heat generated, which has a great influence on the speed of the cross-linking reaction subsequent thereto, varies with the time necessary for effecting preforming of the resin after it has passed through the second orifice 7. If that time is short, the cross-linking reaction can be speeded up, and accordingly, it is necessary to increase the quantity of heat generated in orifice 7. On the contrary, if that time is long, it is necessary to retain a certain degree of fluidity at the time of pre-forming, so that the quantity of heat generated at orifice 7 must be reduced accordingly. The higher is the pressure, the longer is the duration of the time in which fluidity can be retained at the time of pre-forming, so as to enhance the pre-formability of the resin. Also for the purpose of controlling the generation of by-product gases during the cross-linking reaction, the pressure within the passage for the flowing resin in the die 8 is required to be maintained high. The pre-formability has a close relation with the degree of shearing action imparted to the flowing resin in the pre-forming die 8, and the best result can be expected when the shearing speed is zero, that is, when plug-flow occurs. For the purpose of realizing such an ideal condition as far as possible, it is necessary that the coefficient of friction between the resin and the wall surface of the passage in the die 8 through which the resin flow is approximately zero. Meanwhile, from the view point of checking the occurrence of voids, a certain degree of high pressure must be applied to the resin, and an increase of the pressure applied on the resin means an increase in the resistance of the wall surface. That is, concurrent application of these contradictory conditions is requisite for the foregoing purpose.

From the view point of the moldability and workability, it is desirable to shorten the length of the zone for preforming the resin and aging the cross-linking thereof following the second orifice 7, and therefore the time for pre-forming the resin and aging the cross-linking thereof, as much as possible. Accordingly, the temperature of the resin after it has passed the second orifice 7 should be as high as possible, provided that it can undergo a pressure and a shearing force enough for pre-forming, and the set temperature of the passage for flow of the resin after it has passed through the second orifice 7 is desirably maintained high in proportion thereto. It is possible to meet the foregoing requirements for high pressure, high temperature and plug-flow simultaneously by introducing the resin into a heating medium under elevated pressure. As the heating medium for this purpose, any kind of medium is applicable as long as it is superior in thermal stability, has a great thermal capacity and has no bad influence on the properties of the resin. For instance, there can be used silicone oil, surface active agent, glycerol esters and the like. Preferably the medium is one having a superior detergency and which is readily soluble in water. As the heating-medium supply member 11, it is advisable to employ one consisting of any known porous material and having an annular shape from the view point of ensuring uniform heating medium supply.

The heating medium is fed into the boundary zone defined between the inner surface of the molding die and the peripheral surface of the extruded resin article. The inner surface of the annular porous member 11 has a diameter equal to the diameter of the die passage. The heating medium forms an evenly distributed very thin film of uniform thickness on the entire external surface of the extruded resin article and it may in part be absorbed or absorbed into the surface layer of the extruded resin article. In any event, it remains with the extruded resin artile as the article passes through the die sections 9 and 10. It can be removed by the water supplied in the cooling section 13 or by subsequent processing.

The pressure of the heating medium must be higher than the pressure exerted by the resin against the internal wall of the porous member 11. For example the pressure of the heating medium when it contacts the peripheral surface of the extruded resin article is above 15 Kg/cm$^2$, preferably above 50 Kg/cm$^2$. The temperature of the heating medium is within about the range of $\pm 20°$ C of the temperature of the extruded resin article. The flow rate of the heating medium is selected so as to avoid creating roughness or irregularities on the surface of the extruded resin. In a typical embodiment of the invention, the flow rate of the heating medium is selected so that the thickness of the film of heating medium formed on the extruded resin article is from about 0.001 cm to 0.01 cm. It will be understood, however, that the appropriate film thickness can be determined by experiment depending on the particular resin employed.

Thus, the heating medium serves to maintain the surface of the resin under a pressure above 15 Kg/cm$^2$, to prevent substantial surface cooling thereof, and as a lubricating film and to improve heat transfer to the extruded resin article in the die sections 9 and 10.

The position of the second orifice 7 can be between the accumulator 5 and the pre-forming die 8, that is, in the range of from the inside of the outlet of the accumulator 5 to the inlet of the pre-forming die 8, but it must be disposed to correspond to the advance of the degree of cross-linking.

The resin, after attaining a prescribed degree of cross-linking as a result of aging within the die 8, is next cooled under elevated pressure down to a temperature that will no longer permit the chain transfer of molecular chains and the molding is thereafter released so as to be under atmospheric pressure. The object of maintaining the internal pressure of the die above a fixed level, for instance, above 15 Kg/cm², preferably 50 Kg/cm², can be easily achieved by contracting the passage for the resin toward its forward end. The numeral reference 12 denotes a tapered die illustrative of such a die. Cooling of the resin within the passage in the die section 10 is not always required to advance to such an extent that the chain transfer of molecular chains will be completely stopped; the construction of the die is sufficient if it is such that its interior is devised to increase the frictional resistance between the inside wall thereof and the resin so as to obtain a certain degree of internal pressure and it has sufficient mechanical strength to withstand the internal strain under said internal pressure. The construction of the passage in the die must impart the required internal pressure, so that it will be sufficient to provide a contracted portion somewhere in the cooling zone within the die. And from the view point of the effect thereof, said contracted portion is desirably located in the proximity of the forward end of the die. Considering the great influence of the contraction rate of the contracting member and the taper angle of the die upon the resistance, it is advisable to make said die readily changeable. It is also possible to provide on the forward end of the die a mechanism for imparting a resisting force by applying pressure mechanically to the circumference of the extruded object.

The resin extruded from the die 12 is fed into the pressure cooling-medium tank 13, wherein its temperature is lowered to such a degree that chain transfer of molecular chains will stop.

Figure 3:
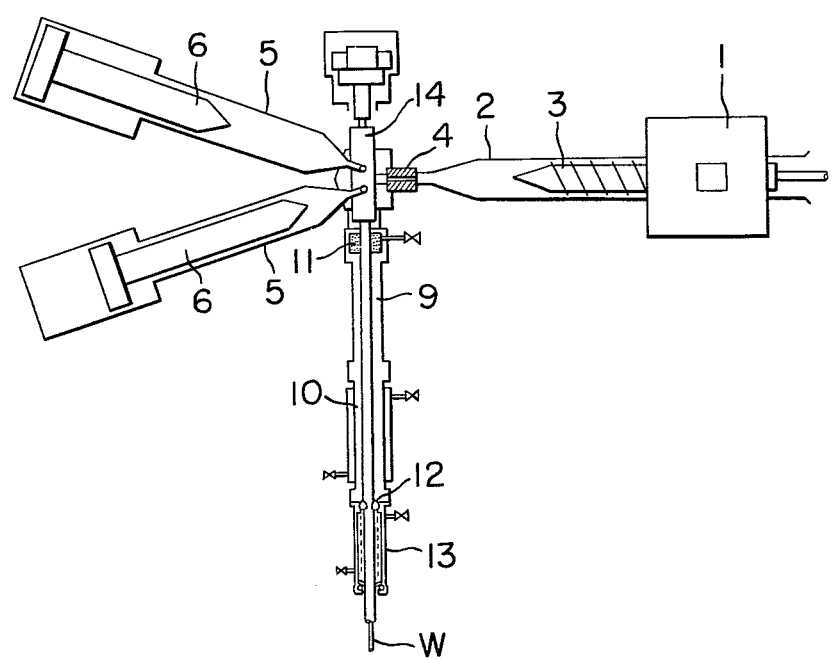
FIG. 3 is a diagrammatic view of another apparatus which can be utilized in practicing the method of the present invention.

FIG. 3 is illustrative of an extrusion-molding apparatus equipped with a pair of accumulators 5. Other particulars of this apparatus are practically the same as that of the apparatus shown in FIG. 1.

As discussed in the foregoing, according to the present invention inasmuch as the resin after melting is held under a far higher pressure than that in the conventional cross-linking extrusion molding methods until it is cooled and solidified, the size as well as the number of the voids in the resulting moldings can be controlled to be by far less than that in the conventional products.

The advantage of the method according to the present invention, wherein the resin is subjected to a high pressure and a strong shearing action and its temperature is raised by the heat generated by utilizing the internal friction, can be displayed to the fullest particularly in the extrusion molding of thick articles. In the conventional methods wherein the resin is extruded in the non-cross-linked state and the cross-linking reaction is thereafter started under a certain degree of pressure within a cross-linking tank by the use of a heating medium, it takes a long time for uniform heating to occur throughout the inside of resin because the thermal conductivity of the material resin is low, and the cost of equipment would be enormous. On the contrary, according to the method of the present invention, there is no necessity for such a long heating time, the cost of the equipment corresponding to the cross-linking tank in the prior art is moderate, and the workability is improved. Besides, the resulting extrusion-molded products are superior in homogeneity and the quality thereof is higher than that of the conventional products.

The process of cooling the resin while moving it under elevated pressure within a die involves a question of productivity in high-speed molding from the view point of operational technique. When high-speed molding is desired, it is appropriate to apply a process comprising extruding the resin after flowing it through the second orifice 9 and passing it through the pre-forming die 8 into a heating medium under such a pressure as will not permit the growth of voids, preferably a pressure of more than 30 Kg/cm², aging its cross-linking within said heating medium, and then introducing it into a pressure cooling-medium to thereby cool and solidify it. The resin at the time of being thus extruded from the die has a temperature and a fluidity of high uniformity, so that it can be readily elongated and is superior in workability. In the case of extrusion molding of thin articles, even by heating from the outside, the temperature of the resin can be uniformly raised all over the inside thereof in a relatively short time, and the effect of shortening the time for cross-linking as an advantage of the method of the present invention is naturally not so conspicuous, but the thinner is the intended product, the more conspicuous becomes the homogeneity of resin contributing to enhancement of the moldability thereof. Moreover, the high-pressure history from the time of injection from the plasticizing chamber 2 to the time of passing the second orifice 7 allows the application of low pressure at the time of cooling. As discussed in the foregoing, the method according to the present invention renders it possible to continuously extrude products with a quality equal to or mostly superior to that of the conventional products in high-speed molding and molding of thin articles.

COMPARATIVE EXAMPLE

In a molding apparatus as shown in FIG. 1, a mixture comprising 100 parts by weight of polyethylene having a density of 0.92 and a melt index of 2.0, 1.25 parts by weight of dicumyl peroxide as the cross-linking agent and 0.5 part by weight of an oxidation-preventing agent was plasticized within a plasticizing chamber having its temperature set at 130° C by means of a screw rotating at 80 r.p.m.. The mixture was passed through a first orifice consisting of two holes each having a diameter of 2 mm and a length of 60 mm by applying a temperature of 130° C, an injection pressure of 1460 Kg/cm² and an injection rate of 9 cm³/sec, and the mixture was introduced into an accumulator through a transfer valve. The temperature of the material was 157° C at the inlet of said accumulator. Next, the material in the accumulator was immediately pushed out by the accumulator plunger under a pressure of 1400 Kg/cm², passed through a second orifice having a diameter of 1 mm and a length of 40 mm via a transfer valve and supplied to a crosshead. This crosshead was provided with a die having an inside diameter of 30 mm and a length of 165 mm for pre-forming rods, and was so devised as to be capable of extruding the material having a temperature of 175° C at the rate of 16 Kg/hr. In the present case the set temperature of said second orifice, crosshead and die was held at 155° C uniformly. A silicone oil having a viscosity of 20 cst and a temperature of 165° C was used as the heating medium and its flow rate was 0.9 cc/min. The average gellation percentage of the rod-shaped products obtained by directly cooling the material extruded from the die with water was 82.3%, and the surface of this product was a little insufficient in gloss and was irregular.

This is attributable to the fact that, because the quantity of heat imparted to the material within the apparatus was excessive, the progress of the cross-linking was too fast and the material flowed into the crosshead in the state of considerably advanced viscosity. As a result, the speed of flow in relation to the resistance of the passage acribable to the design thereof was too great to be alleviated before the material was extruded from the die.

In this connection, the apparatus was continuously operated for 4 hours and was thereafter disassembled. It was found that no residue of the resin was present in the passage for flow. Further, the cycle time of the accumulator was 22 seconds.

EXAMPLE 1

In the same molding apparatus as that employed in the foregoing comparative example, the same material as in said comparative example was plasticized within the plasticizing chamber having its temperature set at 110° C by means of a screw rotating at 80 r.p.m., passed through the first orifice consisting of two holes each having a diameter of 2 mm and a length of 60 mm by applying an injection pressure for injection of 1780 Kg/cm$^2$ and an injection rate of 9 cm$^3$/sec, and was introduced into an accumulator through a transfer valve. The temperature of the material was 145° C at the inlet of said accumulator. Next, the material filled in the accumulator was immediately pushed out by the accumulator plunger under a pressure of 1450 Kg/cm$^2$, passed through the same second orifice as that in the comparative example via a transfer valve, and was extruded from the die at the rate of 16 Kg/hr. The temperature of the material was 145° C during its movement from the second orifice to the inlet of the die and it was 164° C at the outlet of the die. The heating medium was the same silicone oil as described in Comparative Example 1 and its flow rate also was 0.9 cc/min. The average gellation percentage of the rod-shaped products obtained by directly cooling the material extruded from the die with water having a temperature of 17° C under a pressure of 25 Kg/cm$^2$ was 63%, and the surface of this product was satisfactorily glossy.

This is attributable to the fact that, because the molding material whose cross-linking had already been progressing prior to flowing it into the second orifice and whose temperature was raised instantaneously within the second orifice, the reaction was accelerated and was aged.

In this connection, the apparatus was continuously operated for 5 hours, and the cycle time of the accumulator was 22 seconds. When examined after said operation, no residue of the material was found in the passage for flow.

EXAMPLE 2

By the use of a molding apparatus comprising the same preforming die 8 as that used in Example 1, and having a die 9 of 800 mm in length and 30 mm in diameter with a heater and joined to the forward end of said pre-forming die and also having a die 10 of 600 mm in length and 30 mm in diameter with a passage for cooling water and joined to the forward end of said die 9, a taper die 12 with a taper angle of 2° joined to the forward end of said die 10 and a pressure cooling-water tank 13 provided on the forward end of said taper die 12, the work of covering electric wire was carried out. The set temperature for the portion of apparatus ranging from the plasticizing chamber to the pre-forming die 8 and the material employed were the same as in Example 1. The same silicone oil was described in Comparative Example 1 was used and its flow rate was 1.1 cc/min.

A 60 mm$^2$ core wire (W) consisting of hard copper (19 pieces of wire with a diameter of 2 mm each) heated to 130° C was introduced into the nipple 15, covered with the resin in the crosshead 16, coated with silicone oil in the heating-medium supply chamber 11, subjected to cross-linking and aging of the thus coated material in the die 9, slowly cooled in the cooling die 10, further cooled in the taper die 12, and extruded thereafter. The surface of the resulting covered wire was smooth and fine, and the average gellation percentage was more than 80%. When this covered wire was examined through a microscope, 3 voids having a size of 1 – 5μ each were found present at random, and in addition, because voids of less than 1μ were present at the rate of 1 × 10$^3$ per 1 mm$^3$, it was confirmed that the distribution of voids in the radial direction was relatively uniform.

In this connection, the void level of the products obtained by the conventional process of cross-linking by heating with steam as measured by the same procedure as above, is generally in the range of 2–3 × 10$^6$ and the size of the voids is mostly in the range of from several microns to several tens of microns. That is, the void level of the cross-linked moldings according to the method of the present invention is very low compared with that of the conventional moldings.

The present invention is applicable to thermoplastic polymers that can be extruded and simultaneously cross-linked, including any of those polymers noted above that are presently known to be useful for this purpose.

The embodiments of the invention in which an exclusive property or privilege is claimed are defined as follows:

1. A process for cross-linking and extrusion molding a cross-linkable resin, comprising the steps of:
    1. feeding a charge of cross-linkable moldable resin and an amount of cross-linking agent capable of cross-linking said resin into a preliminary plasticizing chamber and therein plasticizing said charge under conditions of temperature and pressure which are insufficient to cause the cross-linking reaction to start so that the charge of plasticized material in said plasticizing chamber does not undergo cross-linking;
    2. feeding said plasticizing charge under pressure from said preliminary plasticizing chamber through a first discharge passage having between its ends an elongated first orifice of smaller cross-sectional area than the cross-sectional areas of the portions of said first discharge passage on either side of said first orifice, said first orifice being effective for imparting a high pressure and a strong shearing action to said charge as it passes through said first orifice and thereby rapidly raising the temperature of the charge to a temperature at which the resin is molten and the cross-linking reaction is started, then flowing the charge, which is undergoing cross-linking, under pressure into the forward end of an accumulator chamber which is isolated from the below-mentioned preform extrusion die and which has a reciprocable plunger therein located close to the forward end of said accumulator chamber, while continuously imposing a constant static back pressure on said plunger in said accumulator chamber to resist retracting movement thereof so that the charge of plasticized material entering the forward end of said accumulator chamber from said first orifice forces said plunger to retract in said accumulator chamber against said back pressure and fills said accumulator chamber and said charge is continuously subjected to said back pressure, and operating valve means to close communication between said plasticizing chamber and said accumulator chamber when said charge has been fed into said accumulator chamber;

3. holding the charge in said accumulator chamber under a pressure and temperature higher than that previously applied on said charge in said plasticizing chamber to render uniform the temperature of the charge in said accumulator chamber and to cause the cross-linking reaction to progress;

4. after said cross-linking reaction has progressed partway to completion but while said charge remains fluid, operating said valve means to place said accumulator chamber in communication with a second discharge passage having between its ends an elongated second orifice of smaller cross-sectional area than the cross-sectional areas of the portions of said second discharge passage on either side thereof, said second discharge passage having an elongated preform extrusion die connected in series therewith, advancing said plunger in said accumulator chamber to discharge said fluid charge therefrom and flowing said fluid charge through said second orifice and imparting a high pressure and a strong shearing action to said fluid charge as it passes through said second orifice and thereby rapidly increasing the temperature of said fluid charge to accelerate the cross-linking reaction, flowing said fluid charge under pressure from said second orifice into and through said preform extrusion die to form an extrudate, and in the inlet end of said preform extrusion die flowing an inert heating fluid having a temperature of from 20° C below to about 20° C above the temperature of the extrudate, under pressure against the exterior of the extrudate and between said exterior and the interior wall of said preform extrusion die to maintain a pressure of above 15 kg/cm² on the extrudate and to maintain the temperature of the extrudate to complete the cross-linking reaction whereby said extrude is maintained under high pressure and high temperature in the inlet end of said preform extrusion die and moves therethrough in substantially plug flow;

5. then moving the extrudate from said preform extrusion die through a cooled die to rigidify the extrudate and terminate cross-linking, the charge being continuously maintained under pressure throughout the foregoing steps 2 to 5, and 6. then discharging the cooled extrudate.

2. A method as claimed in claim 1 in which in step 5 the extrudate is moved through a tapered die effective to maintain a pressure of at least above 15 kg/cm² on the extrudate upstream of said tapered die.

3. A method as claimed in claim 1 in which said resin is polyethylene and said cross-linking agent is dicumyl peroxide.

* * * * *